(12) United States Patent
Zhang

(10) Patent No.: US 12,222,804 B2
(45) Date of Patent: Feb. 11, 2025

(54) ENCODING AND DECODING METHOD, APPARATUS AND DEVICE BASED ON ERASURE POOL, AND STORAGE MEDIUM

(71) Applicant: SHANDONG YINGXIN COMPUTER TECHNOLOGIES CO., LTD., Shandong (CN)

(72) Inventor: Xinliang Zhang, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/271,437

(22) PCT Filed: Feb. 28, 2022

(86) PCT No.: PCT/CN2022/078231
§ 371 (c)(1),
(2) Date: Jul. 7, 2023

(87) PCT Pub. No.: WO2022/199328
PCT Pub. Date: Sep. 29, 2022

(65) Prior Publication Data
US 2024/0061743 A1    Feb. 22, 2024

(30) Foreign Application Priority Data
Mar. 26, 2021   (CN) .......................... 202110325954.X

(51) Int. Cl.
*G06F 11/00* (2006.01)
*G06F 11/10* (2006.01)
*G06F 11/32* (2006.01)

(52) U.S. Cl.
CPC ........ *G06F 11/1044* (2013.01); *G06F 11/327* (2013.01); *G06F 11/328* (2013.01)

(58) Field of Classification Search
CPC ... G06F 11/1044; G06F 11/327; G06F 11/328
See application file for complete search history.

(56) References Cited

U.S. PATENT DOCUMENTS 9,412,471 B2 *   8/2016   Kim ..................... G11C 29/028
10,244,142 B2 *  3/2019   Ikuno ................. H04N 1/00954
(Continued)

FOREIGN PATENT DOCUMENTS

CN     102237090 A     11/2011
CN     104159113 A     11/2014
(Continued)

OTHER PUBLICATIONS

International Search Report for PCT/CN2022/078231 mailed on Apr. 29, 2022 (5 pages including English Translation).
(Continued)

*Primary Examiner* — Esaw T Abraham
(74) *Attorney, Agent, or Firm* — Merchant & Gould P.C.

(57) ABSTRACT

The present disclosure discloses an encoding and decoding method, apparatus and device based on an erasure pool, and a computer readable storage medium. The method includes: storing, upon receiving original data that needs to be subjected to data encoding and decoding, the original data into a shared memory; sending an encoding and decoding signal to an encoding and decoding process, so that the encoding and decoding process obtains the original data from the shared memory after receiving the encoding and decoding signal, and calls a hard codec plug-in to perform a hard encoding and decoding operation; controlling, if the hard encoding and decoding operation fails, the encoding and decoding process to call a soft codec plug-in to perform a soft encoding and decoding operation; and obtaining, after
(Continued)

the encoding and decoding process completes the encoding and decoding operation, an encoding and decoding result from the shared memory.

19 Claims, 2 Drawing Sheets

(56) References Cited

U.S. PATENT DOCUMENTS

| | | | | |
|---|---|---|---|---|
| 10,795,761 | B2* | 10/2020 | Watanabe | H03M 13/2906 |
| 11,150,813 | B2* | 10/2021 | Kifune | G06F 3/0679 |
| 2004/0177308 | A1 | 9/2004 | Kim et al. | |
| 2009/0164762 | A1 | 6/2009 | Huang et al. | |
| 2014/0149828 | A1* | 5/2014 | Chang | H03M 13/3746 714/773 |
| 2020/0091941 | A1* | 3/2020 | Watanabe | G06F 11/1068 |

FOREIGN PATENT DOCUMENTS

| | | |
|---|---|---|
| CN | 104768063 A | 7/2015 |
| CN | 107589916 A | 1/2018 |
| CN | 108399109 A | 8/2018 |
| CN | 106797388 A | 3/2019 |
| CN | 109413432 A | 3/2019 |
| CN | 110958468 A | 4/2020 |
| CN | 111858129 A | 10/2020 |
| CN | 113064751 A | 7/2021 |

OTHER PUBLICATIONS

Written Opinion for PCT/CN2022/078231 dated Jul. 11, 2022 (3 pages).
Chinese Search Report for Application No. 202110325954X dated Jun. 14, 2022 (2 pages).
Chinese Search Report for Application No. 202110325954X dated Mar. 29, 2023 (2 pages).

* cited by examiner

ENCODING AND DECODING METHOD, APPARATUS AND DEVICE BASED ON ERASURE POOL, AND STORAGE MEDIUM

CROSS-REFERENCE TO RELATED APPLICATION

This application is a National Stage Application of International Application No. PCT/CN2022/078231 filed on Feb. 28, 2022, which claims the benefit of Serial No. 202110325954.X, filed on Mar. 26, 2021 in China, and which applications are incorporated herein by reference. To the extent appropriate, a claim of priority is made of the above disclosed applications.

TECHNICAL FIELD

The present disclosure relates to the field of data processing, and more particularly to an encoding and decoding method, apparatus and device based on an erasure pool, and a computer readable storage medium.

BACKGROUND

A distributed system typically uses erasure coding (EC) to realize redundancy of data. If data is lost due to disk failure, the data can be recovered by erasure coding. The distributed system realizes different erasure codec plug-ins according to different open source codes. The distributed system calls the corresponding encoding and decoding function by loading the erasure codec plug-in, thereby realizing the encoding and decoding operation. With the emergence of the accelerator chip, a chip acceleration plug-in is extended on the architecture of the distributed system. The chip acceleration plug-in can directly call the driver API (Application Programming Interface) of the accelerator chip to realize the encoding and decoding. However, when the driver API of the accelerator chip is directly called to perform an encoding and decoding operation on the data, the stability and reliability of the distributed system will rely heavily on the accelerator chip. If a failure or hot plugging occurs to the accelerator chip, this will lead to a failure of the encoding and decoding operation and even a crash of the distributed system, causing fatal impact to the stability and reliability of the distributed system. That is to say, all the current technical solutions directly use an operation process to call the corresponding plug-in to perform the encoding and decoding operation, and when some factors cause a failure of the operation process, it will directly lead to the failure of the encoding and decoding operation and even the crash of the distributed system, which seriously affects the stability and reliability of the distributed system.

Therefore, how to improve the reliability of the encoding and decoding operation and thus the stability and reliability of the distributed system is a technical problem currently to be solved by those skilled in the art.

SUMMARY

Embodiments of the present disclosure provide an encoding and decoding method based on an erasure pool.

The present disclosure provides an encoding and decoding method based on an erasure pool, including:

upon receiving original data that needs to be subjected to data encoding and decoding, the original data is stored into a shared memory;

an encoding and decoding signal is sent to an encoding and decoding process, so that the encoding and decoding process obtains the original data from the shared memory after receiving the encoding and decoding signal, and calls a hard codec plug-in to perform a hard encoding and decoding operation;

in a case that the hard encoding and decoding operation fails, the encoding and decoding process is controlled to call a soft codec plug-in to perform a soft encoding and decoding operation; and after the encoding and decoding process completes the encoding and decoding operation, an encoding and decoding result is obtained from the shared memory.

In some embodiments, the encoding and decoding process obtains the original data from the shared memory after receiving the encoding and decoding signal, and calls the hard codec plug-in to perform the hard encoding and decoding operation specifically includes:

the original data is obtained, by the encoding and decoding process, from the shared memory after receiving the encoding and decoding signal; and by calling a hard codec plug-in interface, a driver API of an accelerator chip is called by the encoding and decoding process, and a corresponding encoding and decoding function is called to perform the hard encoding and decoding operation by utilizing the accelerator chip.

In some embodiments, in a case that the hard encoding and decoding operation fails, the encoding and decoding process is controlled to call the soft codec plug-in to perform the soft encoding and decoding operation specifically includes:

In a case that the hard encoding and decoding operation fails, the encoding and decoding process is controlled to call the corresponding encoding and decoding function to perform the soft encoding and decoding operation by calling a CPU command.

In some embodiments, the method further includes:

a health status of the encoding and decoding process during the encoding and decoding operation is received.

In some embodiments, the health status includes a memory footprint of encoding and decoding, an encoding and decoding speed, an encoding and decoding success rate and time consumed by encoding and decoding.

In some embodiments, the method further includes:

when an abnormality of the health status occurs, an alarm prompt for the abnormality is given.

In some embodiments, after the encoding and decoding process completes the encoding and decoding operation, the encoding and decoding result is obtained from the shared memory specifically includes:

after the encoding and decoding process completes the encoding and decoding operation and receives a prompt message sent by the encoding and decoding process, the encoding and decoding result is obtained from the shared memory.

The present disclosure further provides an encoding and decoding apparatus based on an erasure pool, including:

a storage component, configured to store, upon receiving original data that needs to be subjected to data encoding and decoding, the original data into a shared memory;

a first processing component, configured to send an encoding and decoding signal to an encoding and decoding process, so that the encoding and decoding process obtains the original data from the shared memory after receiving the encoding and decoding signal, and calls a hard codec plug-in to perform a hard encoding and decoding operation;

a second processing component, configured to control, if the hard encoding and decoding operation fails, the encoding and decoding process to call a soft codec plug-in to perform a soft encoding and decoding operation; and an obtaining component, configured to obtain, after the encoding and decoding process completes the encoding and decoding operation, an encoding and decoding result from the shared memory.

The present disclosure further provides an encoding and decoding device based on an erasure pool, including:

a memory, configured to store a computer program; and a processor, configured to implement steps of the encoding and decoding method based on an erasure pool according to any of the above when executing the computer program.

The present disclosure further provides a computer readable storage medium. The computer readable storage medium stores a computer program therein. The computer program, when being executed by a processor, implements steps of the encoding and decoding method based on an erasure pool according to any of the above.

BRIEF DESCRIPTION OF THE DRAWINGS

To describe the technical solutions in the embodiments of the present disclosure or in the related art more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the accompanying drawings without creative efforts.

DETAILED DESCRIPTION OF THE EMBODIMENTS

The technical solutions in the embodiments of the present disclosure will be clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In view of this, a core of the embodiments of the present disclosure is to provide an encoding and decoding method based on an erasure pool, which can improve the reliability of the encoding and decoding operation and thus the stability and reliability of the distributed system. Another core of the present disclosure is to provide an encoding and decoding apparatus and device based on an erasure pool, and a computer readable storage medium, all of which have the above beneficial effects.

In order to make those skilled in the art better understand the solutions of the present disclosure, the present disclosure will be further described in detail with reference to the accompanying drawing and specific implementations.

Figure 1:
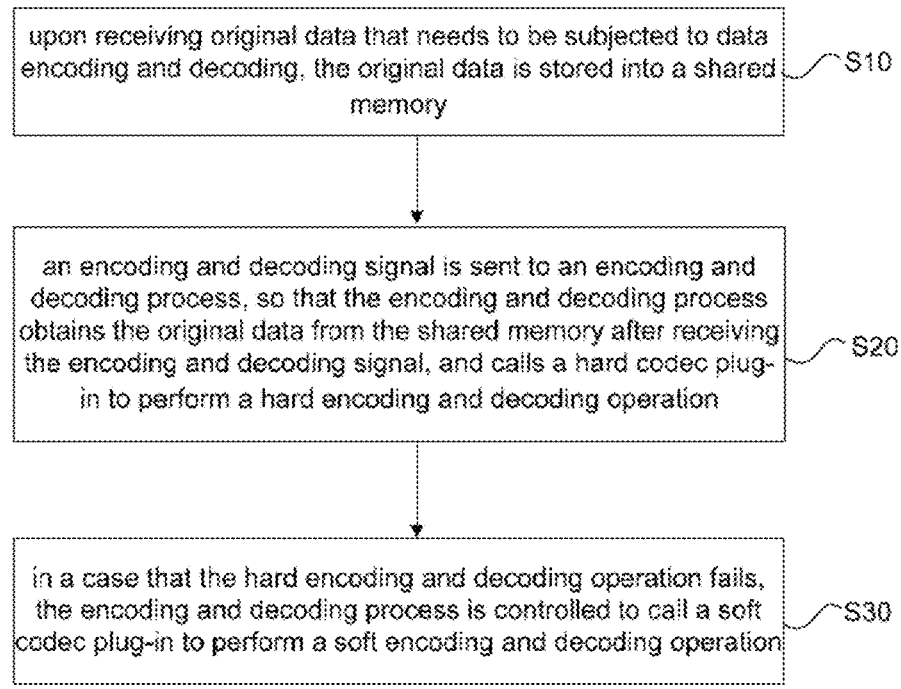
FIG. 1 is a flowchart of an encoding and decoding method based on an erasure pool according to an embodiment of the present disclosure.

FIG. 1 is a flowchart of an encoding and decoding method based on an erasure pool according to an embodiment of the present disclosure. As shown in FIG. 1, an encoding and decoding method based on an erasure pool includes:

S10: Upon receiving original data that needs to be subjected to data encoding and decoding, the original data is stored into a shared memory.

Specifically, the erasure pool is an implementation of a storage pool, which realizes redundancy of data by erasure coding. In this embodiment, a processing process is run in the erasure pool of a distributed system. The processing process is used for maintaining and managing the encoding and decoding process. Besides, after the encoding and decoding process is started, a signaling channel is established with the erasure pool to transmit the encoding and decoding signal.

After the distributed system is started, the erasure pool starts the processing process. When the encoding and decoding operation is needed, the processing process receives the original data that needs to be subjected to data encoding and decoding, and then, the original data is stored into the shared memory. It should be noted that the shared memory refers to a preset storage space for storing data information. By storing the original data into the shared memory, the subsequent encoding and decoding process can obtain the original data from the shared memory and perform the encoding and decoding operation on the original data.

S20: An encoding and decoding signal is sent to an encoding and decoding process, so that the encoding and decoding process obtains the original data from the shared memory after receiving the encoding and decoding signal, and calls a hard codec plug-in to perform a hard encoding and decoding operation.

S30: in a case that the hard encoding and decoding operation fails, the encoding and decoding process is controlled to call a soft codec plug-in to perform a soft encoding and decoding operation.

Specifically, the processing process sends the encoding and decoding signal to the encoding and decoding process after storing the original data into the shared memory, so that a command for an encoding or decoding operation can be performed on the original data. The encoding and decoding process obtains the corresponding original data from the shared memory after receiving the encoding and decoding signal, and then calls the hard codec plug-in to perform the hard encoding and decoding operation on the original data.

It should be noted that the hard encoding and decoding operation refers to an encoding and decoding operation realized by hardware devices such as an accelerator chip. Since a failure or hot plugging may occur to the accelerator chip, which will lead to a failure of the encoding and decoding operation, the processing process of the erasure pool at this time needs to control the encoding and decoding process again to call the soft codec plug-in to perform the soft encoding and decoding operation on the original data. The soft encoding and decoding operation refers to an encoding and decoding operation performed by calling a CPU command.

It should be noted that in this embodiment, the hard codec plug-in is called first to perform the hard encoding and decoding operation, and only when the hard encoding and decoding operation fails, the soft codec plug-in is called to perform the soft encoding and decoding operation, because giving priority to the hard encoding and decoding operation can reduce the CPU usage of the distributed system and improve the performance of the distributed system. In other embodiments, the encoding and decoding process may call the soft codec plug-in to perform the soft encoding and decoding operation before the encoding and decoding process calls the hard codec plug-in to perform the hard encoding and decoding operation.

S40: After the encoding and decoding process completes the encoding and decoding operation, an encoding and decoding result is obtained from the shared memory.

Specifically, after the encoding and decoding process calls the hard codec plug-in/soft codec plug-in to complete the encoding and decoding operation, the corresponding encoding and decoding result is obtained, and then, the encoding and decoding result is stored into the shared memory. The processing process of the erasure pool obtains the encoding and decoding result corresponding to the original data from the shared memory, so that the erasure pool can perform next processing on the encoding and decoding result.

According to the encoding and decoding method based on an erasure pool provided by the embodiment of the present disclosure, the encoding and decoding operation is performed on the original data by utilizing two threads. The process in the erasure pool is used for managing the encoding and decoding process, and the encoding and decoding process is used for calling the corresponding hard codec plug-in/soft codec plug-in to perform the encoding and decoding operation. Therefore, when the hard encoding and decoding operation fails due to the abnormality of the accelerator chip, the process in the erasure pool can continue to call the encoding and decoding process to realize the soft encoding and decoding operation. As a result, the method can improve the reliability of the encoding and decoding operation and thus the stability and reliability of the distributed system.

On the basis of the above embodiment, this embodiment further describes and optimizes the technical solution. Specifically, in this embodiment, the encoding and decoding process obtaining the original data from the shared memory after receiving the encoding and decoding signal, and calling a hard codec plug-in to perform a hard encoding and decoding operation specifically includes:
the encoding and decoding process obtains the original data from the shared memory after receiving the encoding and decoding signal; and
the encoding and decoding process calls a driver API of an accelerator chip by calling a hard codec plug-in interface, and calls a corresponding encoding and decoding function to perform the hard encoding and decoding operation by utilizing the accelerator chip.

Specifically, in this embodiment, the encoding and decoding process first obtains the original data from the shared memory after receiving the encoding and decoding signal. Then, the hard codec plug-in interface is called, and the driver API of the accelerator chip is called by utilizing the hard codec plug-in interface such that the accelerator chip is called. When the accelerator chip runs, the corresponding encoding and decoding function is called to perform the hard encoding and decoding operation on the original data.

As an optional implementation, the controlling, if the hard encoding and decoding operation fails, the encoding and decoding process to call a soft codec plug-in to perform a soft encoding and decoding operation specifically includes:
if the hard encoding and decoding operation fails, the encoding and decoding process is controlled to call the corresponding encoding and decoding function to perform the soft encoding and decoding operation by calling a CPU command.

Specifically, in this embodiment, when it is determined that the hard encoding and decoding operation fails, the encoding and decoding process is further controlled to call the CPU command, so as to call the corresponding encoding and decoding function to perform the soft encoding and decoding operation on the original data.

As can be seen, the steps of realizing the hard encoding and decoding operation and the soft encoding and decoding operation provided in this embodiment are more convenient.

On the basis of the above embodiment, this embodiment further describes and optimizes the technical solution. Specifically, in this embodiment, the method further includes:
a health status of the encoding and decoding process during the encoding and decoding operation is received.

In this embodiment, the encoding and decoding process further obtains the corresponding health status during the encoding and decoding operation, and sends the obtained erasure pool based on a pre-established signaling channel. It should be noted that the health status includes a memory footprint of encoding and decoding, an encoding and decoding speed, an encoding and decoding success rate and time consumed by encoding and decoding.

Specifically, the memory footprint of encoding and decoding refers to usage of the memory, and proportion of content usage in the total memory during the encoding and decoding. The encoding and decoding speed refers to the processing speed of the encoding and decoding operation performed by the hard codec plug-in or soft codec plug-in. The encoding and decoding success rate refers to the probability that the correct encoding and decoding result is obtained by completing the encoding and decoding by the hard encoding and decoding operation or soft encoding and decoding operation. The time consumed by encoding and decoding refers to the total time from the obtaining of the original data to the obtaining of the encoding and decoding result by the encoding and decoding process.

As can be seen, in this embodiment, the encoding and decoding process further reports the health status, so that the user can know the status of the encoding and decoding operation more clearly and directly, thus further improving the user experience.

As an optional implementation, in this embodiment, the method further includes:
when an abnormality of the health status occurs, an alarm prompt is given for the abnormality.

It should be noted that in this embodiment, analysis is performed on the basis of the health status reported by the encoding and decoding process, and when the abnormality of the health status is determined, a preset prompting device is further triggered to send out a corresponding alarm message to give the alarm prompt.

Specifically, the abnormality of the health status includes a too high memory footprint of encoding and decoding, and/or a too low encoding and decoding speed, and/or a too low encoding and decoding success rate, and/or too long time consumed by encoding and decoding. The prompting device may specifically be a buzzer and/or an indicator light and/or a display. The prompting device such as the buzzer/indicator light/display is triggered to send out a corresponding alarm message (e.g., buzz/flashing light/text or picture) to give the alarm prompt, so as to directly prompt the user that there is an abnormality in the current encoding and decoding process. Moreover, the prompting device may send out a corresponding alarm message according to different abnormalities, so that the user can determine the corresponding abnormality according to the type of the alarm message, thereby further improving the user experience.

On the basis of the above embodiment, this embodiment further describes and optimizes the technical solution. Specifically, in this embodiment, the obtaining, after the encoding and decoding process completes the encoding and decoding operation, an encoding and decoding result from the shared memory specifically includes:

After the encoding and decoding process completes the encoding and decoding operation and receives a prompt message sent by the encoding and decoding process, the encoding and decoding result is obtained from the shared memory.

In some embodiments, the processing process of the erasure pool obtains the encoding and decoding result corresponding to the original data from the shared space according to a preset period. However, in this manner, if the specific preset period is too long, the corresponding encoding and decoding result will not be obtained in time, and if the specific preset period is too short, repeatedly sending obtaining requests to the shared space will lead to a waste of processing resources.

In this embodiment, after the encoding and decoding process completes the encoding and decoding operation and obtains the encoding and decoding result, the encoding and decoding result is stored into the shared memory, and a corresponding prompt message is sent to the erasure pool. After receiving the corresponding prompt message, the erasure pool obtains the encoding and decoding result corresponding to the original data from the shared memory.

It can be understood that the processing process of the erasure pool sends the request to obtain the corresponding encoding and decoding result after obtaining the prompt message, so that the frequency that the erasure pool sends requests to the shared memory can be relatively reduced on the basis of obtaining the corresponding encoding and decoding result in time, which relatively saves the processing resources.

The embodiment of the encoding and decoding method based on an erasure pool according to the present disclosure has been described in detail above. The present disclosure further provides an encoding and decoding apparatus and device based on an erasure pool, and a computer readable storage medium corresponding to this method. Since the embodiments of the apparatus, device and computer readable storage medium correspond to the embodiments of the method, for the embodiments of the apparatus, device and computer readable storage medium, reference may be made to the description for the embodiments of the method, and details will not be repeated here.

Figure 2:
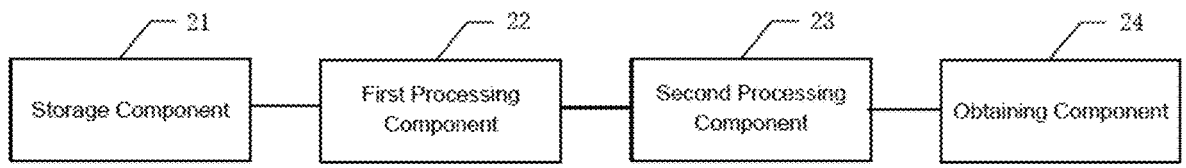
FIG. 2 is a structural diagram of an encoding and decoding apparatus based on an erasure pool according to an embodiment of the present disclosure.

FIG. 2 is a structural diagram of an encoding and decoding apparatus based on an erasure pool according to an embodiment of the present disclosure. As shown in FIG. 2, an encoding and decoding apparatus based on an erasure pool includes:

a storage component 21, configured to store, upon receiving original data that needs to be subjected to data encoding and decoding, the original data into a shared memory;

a first processing component 22, configured to send an encoding and decoding signal to an encoding and decoding process, so that the encoding and decoding process obtains the original data from the shared memory after receiving the encoding and decoding signal, and calls a hard codec plug-in to perform a hard encoding and decoding operation;

a second processing component 23, configured to control, if the hard encoding and decoding operation fails, the encoding and decoding process to call a soft codec plug-in to perform a soft encoding and decoding operation; and an obtaining component 24, configured to obtain, after the encoding and decoding process completes the encoding and decoding operation, an encoding and decoding result from the shared memory.

The encoding and decoding apparatus based on an erasure pool according to this embodiment of the present disclosure has the beneficial effects of the encoding and decoding method based on an erasure pool described above.

As an optional implementation, another encoding and decoding apparatus based on an erasure pool further includes:

a receiving component, configured to receive a health status of the encoding and decoding process during the encoding and decoding operation.

As an optional implementation, still another encoding and decoding apparatus based on an erasure pool further includes:

a prompting component, configured to give, when an abnormality of the health status occurs, an alarm prompt for the abnormality.

Figure 3:
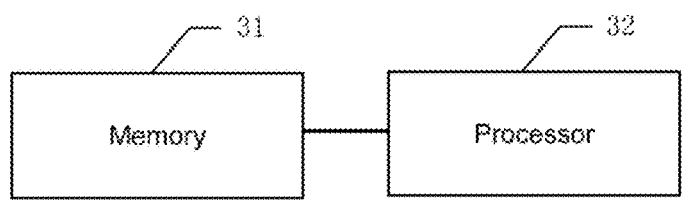
FIG. 3 is a structural diagram of an encoding and decoding device based on an erasure pool according to an embodiment of the present disclosure.

FIG. 3 is a structural diagram of an encoding and decoding device based on an erasure pool according to an embodiment of the present disclosure. As shown in FIG. 3, an encoding and decoding device based on an erasure pool includes:

a memory 31, configured to store a computer program; and a processor 32, configured to implement steps of the encoding and decoding method based on an erasure pool as described above when executing the computer program.

The encoding and decoding device based on an erasure pool according to this embodiment of the present disclosure has the beneficial effects of the encoding and decoding method based on an erasure pool described above.

Figure 4:
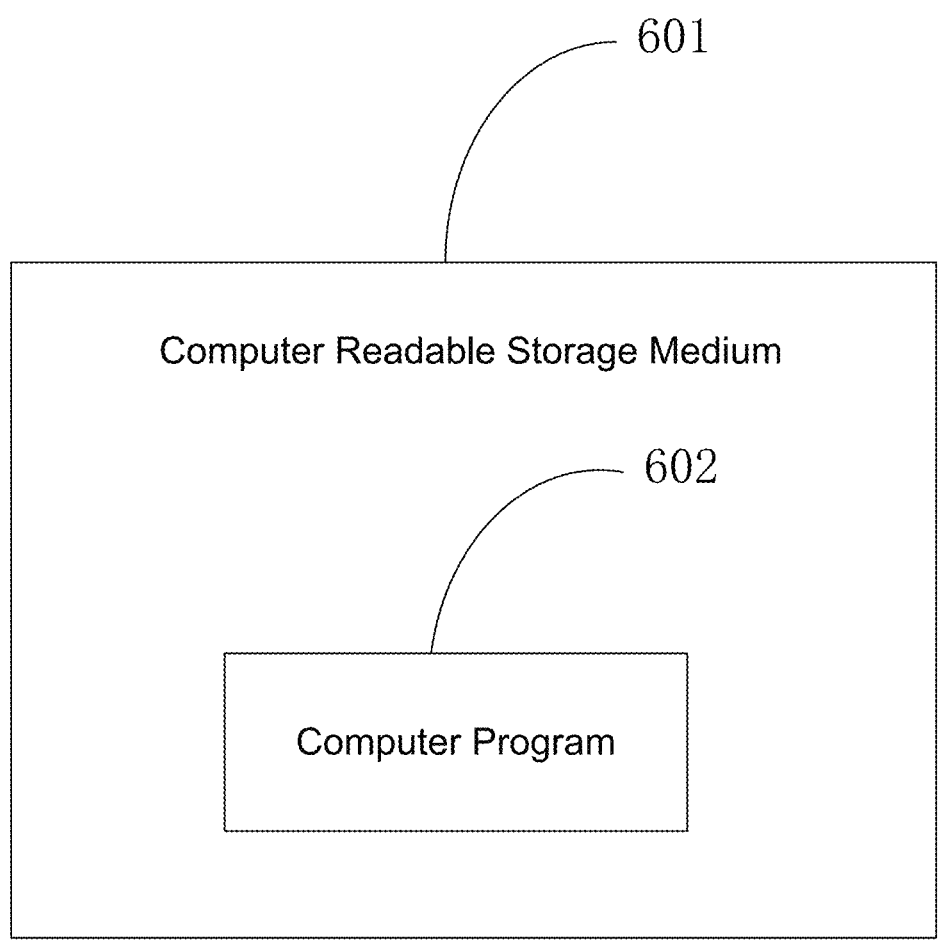
FIG. 4 is a schematic structural diagram of a computer readable storage medium according to an embodiment of the present disclosure.

In order to solve the above technical problems, the present disclosure further provides a computer readable storage medium. FIG. 4 is a schematic structural diagram of a computer readable storage medium according to an embodiment of the present disclosure. As shown in FIG. 4, the computer readable storage medium 601 stores a computer program 602 therein. The computer program 602, when being executed by a processor, implements steps of the encoding and decoding method based on an erasure pool as described above.

The computer readable storage medium 601 according to this embodiment of the present disclosure has the beneficial effects of the encoding and decoding method based on an erasure pool described above.

The encoding and decoding method, apparatus and device based on an erasure pool, and the computer readable storage medium according to the present disclosure have been described in detail above. Specific embodiments are used herein to explain the principles and implementations of the present disclosure, and the description of the embodiments above is only used to help understand the method and core idea of the present disclosure. It should be noted that those of ordinary skill in the art can make several improvements and modifications to the present disclosure without departing from the principles of the present disclosure, and such improvements and modifications also fall into the protection scope of the appended claims of the present disclosure.

The various embodiments in the specification are described in a progressive manner. Each embodiment focuses on differences from other embodiments, and for the same or similar parts between the embodiments, reference can be made to each other. Since the apparatus disclosed in the embodiments correspond to the method disclosed in the embodiments, the description is relatively simple, and for the relevant parts, reference can be made to the description of the method.

A person skilled in the art may further understand that, units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on functions. Whether these functions are executed in hardware or software depends on particular applications and design constraints of the technical solutions. A person skilled in the art may use different methods to implement the described functions for each particular application, but it should not be considered that this implementation goes beyond the scope of the present disclosure.

The invention claimed is:

1. An encoding and decoding method based on an erasure pool, comprising:
   storing by a processing process which is run in the erasure pool, upon receiving original data that needs to be subjected to data encoding and decoding by the processing process, the original data into a shared memory;
   sending an encoding and decoding signal to an encoding and decoding process by the processing process, so that the encoding and decoding process obtains the original data from the shared memory after receiving the encoding and decoding signal, and calls a hard codec plug-in to perform a hard encoding and decoding operation;
   controlling by the processing process, in a case that a failure or hot plugging occurs to the accelerator chip, which will lead to a failure of the encoding and decoding operation, the encoding and decoding process to call a soft codec plug-in to perform a soft encoding and decoding operation; and
   obtaining by the processing process, after the encoding and decoding process completes the encoding and decoding operation, an encoding and decoding result from the shared memory,
   wherein the encoding and decoding process obtaining the original data from the shared memory after receiving the encoding and decoding signal, and calling the hard codec plug-in to perform the hard encoding and decoding operation specifically comprises:
   obtaining, by the encoding and decoding process, the original data from the shared memory after receiving the encoding and decoding signal; and
   calling, by the encoding and decoding process, a driver API of an accelerator chip by calling a hard codec plug-in interface, and calling a corresponding encoding and decoding function to perform the hard encoding and decoding operation by utilizing the accelerator chip.

2. The method according to claim 1, wherein the controlling, in a case that the hard encoding and decoding operation fails, the encoding and decoding process to call the soft codec plug-in to perform the soft encoding and decoding operation specifically comprises:
   controlling, if the hard encoding and decoding operation fails, the encoding and decoding process to call the corresponding encoding and decoding function to perform the soft encoding and decoding operation by calling a CPU command.

3. The method according to claim 1, further comprising:
   receiving a health status of the encoding and decoding process during the encoding and decoding operation.

4. The method according to claim 3, wherein the health status comprises a memory footprint of encoding and decoding, an encoding and decoding speed, an encoding and decoding success rate and time consumed by encoding and decoding.

5. The method according to claim 3, further comprising:
   giving, when an abnormality of the health status occurs, an alarm prompt for the abnormality.

6. The method according to claim 5, wherein giving, when the abnormality of the health status occurs, the alarm prompt for the abnormality comprises:
   performing analysis on the basis of the health status reported by the encoding and decoding process;
   when the abnormality of the health status is determined, triggering a preset prompting device to send out a corresponding alarm message to give the alarm prompt.

7. The method according to claim 6, wherein performing analysis on the basis of the health status reported by the encoding and decoding process comprises:
   analysing the health status based on a parameter of the encoding and decoding process, wherein the parameter comprises at least one of the following: a memory footprint of encoding and decoding, a encoding and decoding speed, a encoding and decoding success rate, and time consumed by encoding and decoding.

8. The method according to claim 6, wherein the prompting device comprises at least one of the following: a buzzer, an indicator light, and a display.

9. The method according to claim 3, wherein receiving the health status of the encoding and decoding process during the encoding and decoding operation comprises:
   obtaining the health status, by the encoding and decoding process, during the encoding and decoding operation;
   sending the health status to the erasure pool, by the encoding and decoding process, based on a pre-established signaling channel.

10. The method according to claim 1, wherein obtaining, after the encoding and decoding process completes the encoding and decoding operation, the encoding and decoding result from the shared memory specifically comprises:
    obtaining, after the encoding and decoding process completes the encoding and decoding operation and receives a prompt message sent by the encoding and decoding process, the encoding and decoding result from the shared memory.

11. The method according to claim 10, wherein obtaining, after the encoding and decoding process completes the encoding and decoding operation and receives the prompt message sent by the encoding and decoding process, the encoding and decoding result from the shared memory comprises:

after the encoding and decoding process completes the encoding and decoding operation and obtains the encoding and decoding result, storing the encoding and decoding result into the shared memory, and sending the prompt message to the erasure pool;

after receiving the prompt message, obtaining the encoding and decoding result corresponding to the original data, by the erasure pool, from the shared memory.

12. The method according to claim 1, the method further comprising:
running a processing process in the erasure pool of a distributed system, wherein the processing process is used for maintaining and managing the encoding and decoding process;
after the encoding and decoding process is started, establishing a signaling channel with the erasure pool to transmit the encoding and decoding signal.

13. The method according to claim 12, wherein storing, upon receiving the original data that needs to be subjected to data encoding and decoding, the original data into the shared memory comprises:
after the distributed system is started, starting the processing process by the erasure pool;
when the encoding and decoding operation is needed, receiving the original data that needs to be subjected to data encoding and decoding by the processing process, and storing the original data into the shared memory.

14. The method according to claim 12, wherein obtaining, after the encoding and decoding process completes the encoding and decoding operation, the encoding and decoding result from the shared memory comprises:
after the encoding and decoding process calls the hard codec plug-in/soft codec plug-in to complete the encoding and decoding operation, obtaining the encoding and decoding result;
storing the encoding and decoding result into the shared memory;
obtaining the encoding and decoding result corresponding to the original data, by the processing process of the erasure pool, from the shared memory.

15. The method according to claim 1, wherein the hard encoding and decoding operation refers to an encoding and decoding operation realized by hardware devices which comprise an accelerator chip.

16. The method according to claim 12, wherein controlling, in a case that the hard encoding and decoding operation fails, the encoding and decoding process to call the soft codec plug-in to perform the soft encoding and decoding operation comprises:
in a case that a failure or hot plugging may occur to the accelerator chip, which lead to a failure of the encoding and decoding operation, controlling the encoding and decoding process, by the processing process of the erasure pool, to call the soft codec plug-in to perform the soft encoding and decoding operation on the original data.

17. The method according to claim 1, wherein the soft encoding and decoding operation refers to an encoding and decoding operation performed by calling a CPU command.

18. An encoding and decoding device based on an erasure pool, comprising:
a memory, configured to store a computer program; and
one or more processors,
herein, when the computer program is executed by the one or more processors, the one or more processors are enabled to:

store, upon receiving original data that needs to be subjected to data encoding and decoding, the original data into a shared memory;
send an encoding and decoding signal to an encoding and decoding process, so that the encoding and decoding process obtains the original data from the shared memory after receiving the encoding and decoding signal, and calls a hard codec plug-in to perform a hard encoding and decoding operation;
control, in a case that a failure or hot plugging occurs to the accelerator chip, which will lead to a failure of the encoding and decoding operation, the encoding and decoding process to call a soft codec plug-in to perform a soft encoding and decoding operation; and
obtain, after the encoding and decoding process completes the encoding and decoding operation, an encoding and decoding result from the shared memory,
wherein the encoding and decoding process obtains the original data from the shared memory after receiving the encoding and decoding signal, and calls the hard codec plug-in to perform the hard encoding and decoding operation specifically comprises:
the encoding and decoding process obtains the original data from the shared memory after receiving the encoding and decoding signal; and
the encoding and decoding process calls a driver API of an accelerator chip by calling a hard codec plug-in interface, and calls a corresponding encoding and decoding function to perform the hard encoding and decoding operation by utilizing the accelerator chip.

19. A computer readable storage medium, wherein the computer readable storage medium stores a computer program therein, when the computer program is executed by one or more processors, the one or more processors are enabled to:
store, upon receiving original data that needs to be subjected to data encoding and decoding, the original data into a shared memory;
send an encoding and decoding signal to an encoding and decoding process, so that the encoding and decoding process obtains the original data from the shared memory after receiving the encoding and decoding signal, and calls a hard codec plug-in to perform a hard encoding and decoding operation;
control, in a case that a failure or hot plugging occurs to the accelerator chip, which will lead to a failure of the encoding and decoding operation, the encoding and decoding process to call a soft codec plug-in to perform a soft encoding and decoding operation; and
obtain, after the encoding and decoding process completes the encoding and decoding operation, an encoding and decoding result from the shared memory,
wherein the encoding and decoding process obtains the original data from the shared memory after receiving the encoding and decoding signal, and calls the hard codec plug-in to perform the hard encoding and decoding operation specifically comprises:
the encoding and decoding process obtains the original data from the shared memory after receiving the encoding and decoding signal; and
the encoding and decoding process calls a driver API of an accelerator chip by calling a hard codec plug-in interface, and calls a corresponding encoding and decoding function to perform the hard encoding and decoding operation by utilizing the accelerator chip.

* * * * *